(12) United States Patent
Park et al.

(10) Patent No.: US 9,553,655 B2
(45) Date of Patent: Jan. 24, 2017

(54) DATA-RECEIVING METHOD AND APPARATUS FOR RELAY STATION IN WIRELESS COMMUNICATION SYSTEM

(75) Inventors: Kyu Jin Park, Anyang-si (KR); Jae Hoon Chung, Anyang-si (KR); Han Gyu Cho, Anyang-si (KR); Yeong Hyeon Kwon, Anyang-si (KR); Sung Ho Moon, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 855 days.

(21) Appl. No.: 13/254,445

(22) PCT Filed: Feb. 24, 2010

(86) PCT No.: PCT/KR2010/001144
§ 371 (c)(1),
(2), (4) Date: Sep. 1, 2011

(87) PCT Pub. No.: WO2010/101366
PCT Pub. Date: Sep. 10, 2010

(65) Prior Publication Data
US 2011/0317610 A1    Dec. 29, 2011

Related U.S. Application Data

(60) Provisional application No. 61/156,886, filed on Mar. 3, 2009, provisional application No. 61/176,491, filed
(Continued)

(30) Foreign Application Priority Data

Feb. 23, 2010    (KR) .................... 10-2010-0016308

(51) Int. Cl.
*H04W 4/06*      (2009.01)
*H04B 7/155*     (2006.01)
(Continued)

(52) U.S. Cl.
CPC ............ *H04B 7/155* (2013.01); *H04B 7/2606* (2013.01); *H04L 5/0007* (2013.01); *H04L 5/0053* (2013.01);
(Continued)

(58) Field of Classification Search
CPC . H04B 7/2606; H04B 7/15528; H04B 7/2656; H04B 7/155; H04W 84/047; H04L 2001/0097; H04L 5/0053; H04L 5/0094; H04L 5/0007; H04L 27/2602
(Continued)

(56) References Cited

U.S. PATENT DOCUMENTS

2008/0095106 A1   4/2008  Malladi et al.
2008/0144552 A1   6/2008  Johansson et al.
(Continued)

FOREIGN PATENT DOCUMENTS

CN    101222272    7/2008
CN    101299634    11/2008
(Continued)

OTHER PUBLICATIONS

Nortel Networks, "Control Channel and Data Channel Design for Relay Link in LTE-Advanced," R1-090153, 3GPP TSG-RAN WG1 #55bis, Jan. 2009.
(Continued)

*Primary Examiner* — Hoang-Chuong Vu
(74) *Attorney, Agent, or Firm* — Lee Hong Degerman Kang Waimey

(57) ABSTRACT

A method for receiving data by a relay station (RS) in a wireless communication system includes: receiving radio resource allocation information via an R-PDCCH (R-Physical Downlink Control Channel); and receiving data from a base station (BS) via an R-PDSCH (R-Physical Downlink Shared Channel) indicated by the radio resource allocation
(Continued)

information, wherein the radio resource allocation information includes information regarding an allocation of resource blocks in a frequency domain and information regarding an allocation of OFDM symbols in a time domain. Since the radio resource allocation information providing information regarding a time relationship between a control channel transmitted by the BS to a UE and a control channel transmitted by the RS to a UE connected to the RS is provided, the RS can reliably receive a signal transmitted from the BS in a backhaul link between the BS and the RS in a wireless communication system including the RS.

3 Claims, 13 Drawing Sheets

Related U.S. Application Data on May 8, 2009, provisional application No. 61/233,839, filed on Aug. 14, 2009.

(51) Int. Cl.
*H04B 7/26* (2006.01)
*H04L 5/00* (2006.01)
*H04L 27/26* (2006.01)

(52) U.S. Cl.
CPC ......... *H04L 5/0094* (2013.01); *H04L 27/2602* (2013.01)

(58) Field of Classification Search
USPC ............... 370/203, 274, 249, 293, 312, 315, 492,370/501
See application file for complete search history.

(56) References Cited

U.S. PATENT DOCUMENTS

| | | | |
|---|---|---|---|
| 2008/0181167 A1 | 7/2008 | Sydir et al. | |
| 2008/0198941 A1 | 8/2008 | Song et al. | |
| 2008/0240014 A1 | 10/2008 | Chang et al. | |
| 2008/0282126 A1 | 11/2008 | Chindapol et al. | |
| 2009/0262678 A1 | 10/2009 | Oyman et al. | |
| 2010/0098012 A1 | 4/2010 | Bala et al. | |
| 2010/0167743 A1* | 7/2010 | Palanki et al. | 455/436 |
| 2010/0290376 A1* | 11/2010 | Dai et al. | 370/294 |
| 2010/0316096 A1* | 12/2010 | Adjakple et al. | 375/211 |
| 2010/0323745 A1* | 12/2010 | Chen et al. | 455/522 |
| 2011/0013552 A1* | 1/2011 | Ali et al. | 370/315 |
| 2011/0051657 A1 | 3/2011 | Li et al. | |
| 2011/0149886 A1* | 6/2011 | Xu | H04B 7/0628 370/329 |
| 2011/0170471 A1* | 7/2011 | Dahlman et al. | 370/312 |
| 2011/0194483 A1* | 8/2011 | Ji et al. | 370/315 |
| 2011/0194500 A1 | 8/2011 | Kim et al. | |
| 2012/0093071 A1* | 4/2012 | Huang et al. | 370/315 |
| 2012/0113889 A1* | 5/2012 | Noh | H04B 7/155 370/315 |
| 2012/0114021 A1* | 5/2012 | Chung | H04B 7/155 375/211 |
| 2013/0250855 A1* | 9/2013 | Bhattad et al. | 370/328 |

FOREIGN PATENT DOCUMENTS

| | | |
|---|---|---|
| KR | 10-2005-0043302 | 5/2005 |
| KR | 10-2008-0002292 | 1/2008 |
| KR | 10-2008-0020425 | 3/2008 |

OTHER PUBLICATIONS

Nortel, "Control Channel and Data Channel Design for Relay Link in LTE-Advanced," R1-090753, 3GPP TSG-RAN WG1 #56, Feb. 2009.
Nortel, "Control Channel and Data Channel Design for Relay Link in LTEAdvanced," 3GPP TSG-RAN Working Group 1 Meeting #56, R1-090753, Feb. 2009, 9 pages.
The State Intellectual Property Office of the People's Republic of China Application Serial No. 201080010321.X, Office Action dated Nov. 5, 2013, 8 pages.
U.S. Appl. No. 13/126,918, Office Action dated Jan. 31, 2014, 24 pages.
U.S. Appl. No. 13/126,918, Notice of Allowance dated Jun. 24, 2014, 14 pages.
U.S. Appl. No. 13/126,918, Final Office Action dated Jul. 31, 2013, 17 pages.
LG Electronics, "Modification of Downlink Asynchronous HARQ scheme," 3GPP TSG RAN WG1 #48, R1-070925 (Resubmission of R1-070244), Feb. 2007, 5 pages.
LG Electronics, "Modifications of Uplink Synchronous HARQ scheme," 3GPP TSG RAN WG1 #48, R1-070926 (Resubmission of R1-070245), Feb. 2007, 5 pages.
LG Electronics, "Modifications of Uplink Synchronous HARQ scheme," 3GPP TSG RAN WG1 #48bis, R1-071555 (Resubmission of R1-070926), Mar. 2007, 5 pages.
LG Electronics, "Further considerations on UL synchronous HARQ and its modification," 3GPP TSG RAN WG1 #49, R1-072355, May 2007, 6 pages.
Yue, et al., "Hybrid ARQ Protocols and Signaling for DL and UL Transmissions," IEEE C802.16m-08/334r1, XP068000873, May 2008, 10 pages.
European Patent Office Application Serial No. 09823846.2, Search Report dated Oct. 7, 2014, 10 pages.
Nortel, "Control Channel and Data Channel Design for Relay Link in LTE-Advanced," 3GPP TSG-RAN Working Group 1 Meeting #56, R1-090753, Feb. 2009, 9 pages.
The State Intellectual Property Office of the People's Republic of China Application Serial No. 201080010321.X, Office Action dated Jul. 16, 2014, 21 pages.

\* cited by examiner

DATA-RECEIVING METHOD AND APPARATUS FOR RELAY STATION IN WIRELESS COMMUNICATION SYSTEM

CROSS-REFERENCE TO RELATED APPLICATIONS

This application is the National Stage filing under 35 U.S.C. 371 of International Application No. PCT/KR2010/001144, filed on Feb. 24, 2010, which claims the benefit of earlier filing date and right of priority to Korean Application No. 10-2010-0016308, filed on Feb. 23, 2010, and also claims the benefit of U.S. Provisional Application Ser. No. 61/233,839, filed on Aug. 14, 2009, 61/176,491, filed on May 8, 2009, and 61/156,886, filed on Mar. 3, 2009, the contents of which are all hereby incorporated by reference herein in their entirety.

BACKGROUND OF THE INVENTION

Field of the Invention

The present invention relates to wireless communication and, more particularly, to a method and apparatus for receiving data by a relay station in a backhaul link between a base station and the relay station in a wireless communication system.

Description of the Related Art

An ITU-R (International Telecommunication Union Radio communication sector) is working on standardization of IMT (International Mobile Telecommunication)-Advanced, a next-generation mobile communication system after the third generation. IMT-Advanced aims at supporting IP (Internet Protocol)-based multimedia service at a data rate of 1 Gbps in a stationary and low-speed movement state and at a data rate of 100 Mbps in a high speed movement state.

3GPP (3rd Generation Partnership Project) is preparing LTE (Long Term Evolution)-Advanced (LTE-A), an advanced version of LTE which is based on OFDMA (Orthogonal Frequency Division Multiple Access)/SC-FDMA (Single Carrier-Frequency Division Multiple Access) transmission scheme, as a system standard that meets the requirements of IMT-Advanced. LTE-A is one of potential candidates for IMT-Advanced. Primary techniques of LTE-A include a relay station technique.

A relay station (RS) is a device relaying signals between a base station (BS) and a user equipment (UE), which is used to extend a cell coverage and improve throughput of a wireless communication system.

Currently, research into a method for transmitting signals between a BS and an RS in a wireless communication system is actively ongoing in a wireless communication including the RS. The use of the related art method of transmitting signals between a BS and a UE as it is in order to transmit signals between a BS and an RS may be problematic. For example, in the conventional LTE, a BS transmits only resource block allocation information (or resource block assignment information) in a frequency domain with respect to a PDSCH (physical downlink shared channel), via which data is transmitted, through a PDCCH (physical downlink control channel), via which a control signal is transmitted, to the UE, and does not transmit allocation information regarding OFDM (orthogonal frequency division multiplexing) symbols in a time domain. This is because the UE can know about the allocation information regarding the OFDM symbols in the time domain with respect to the PDSCH from the size (the number of OFDM symbols) of the PDCCH transmitted via a PCFICH (Physical Control Format Indicator Channel).

In this respect, however, the backhaul link between the BS and the RS has the characteristics in which the OFDM symbols for the RS to receive the PDCCH thereby may differ according to the size of the PDCCH transmitted by the BS to the UE and the size of the PDCCH transmitted by the RS to the UE connected to the RS. Thus, in the related art, the RS may not properly receive the PDCCH from the BS, and resultantly, the RS cannot properly receive data.

A method and apparatus for receiving data by a RS in consideration of the characteristics of the backhaul link in the wireless communication system including an RS are required.

SUMMARY OF THE INVENTION

An aspect of the present invention provides a method and apparatus for effectively receiving data by a relay station in a backhaul link between a base station and the relay station in a wireless communication system including the relay station.

According to an aspect of the present invention, there is provided a method for receiving data by a relay station in a wireless communication system, including: receiving radio resource allocation information via an R-PDCCH (Relay-Physical Downlink Control Channel); and receiving data from a base station via an R-PDSCH (Relay-Physical Downlink Shared Channel) indicated by the radio resource allocation information, wherein the radio resource allocation information includes information regarding an allocation of resource blocks in a frequency domain and information regarding an allocation of OFDM symbols in a time domain.

According to another aspect of the present invention, there is provided a relay station including: an RF unit transmitting and receiving a radio signal; and a processor connected to the RF unit, wherein the processor receives radio resource allocation information from a base station via an R-PDCCH (Relay-Physical Downlink Control Channel) and receives data from the base station via an R-PDSCH (Relay-Physical Downlink Shared Channel) indicated by the radio resource allocation information, and the radio resource allocation information includes information regarding an allocation of resource blocks in a frequency domain and information regarding an allocation of OFDM symbols in a time domain.

According to embodiments of the present invention, by providing radio resource allocation information indicating a time relationship between a control channel transmitted by a base station to a user equipment and a control channel transmitted by a relay station to a UE connected to the relay station, the relay station can reliably receive a signal transmitted by the base station in a backhaul link between the base station and the relay station in a wireless communication system including the relay station.

DETAILED DESCRIPTION OF THE INVENTION

3GPP (3rd Generation Partnership Project) LTE (long term evolution), part of E-UMTS (Evolved-Universal Mobile Telecommunications System), employs OFDMA in downlink and SC-FDMA in uplink. LTE-A (LTE-Advanced) is an evolution of LTE. An LTE system is based on 3GPP TS Release 8, and an LTE-A system has backward compatibility with an LTE system.

In order to clarify the description of the present invention, 3GPP LTE/LTE-A will be largely described but a technical feature of the present invention is not limited thereto. Hereinafter, an LTE terminal refers to a terminal supporting LTE, and an LTE-A terminal is a terminal supporting LTE and/or LTE-A. However, this is merely illustrative, and the LTE terminal may be a first terminal supporting a first RAT (Radio Access Technology) and the LTE-A terminal may be a second terminal supporting a second RAT providing backward compatibility to the first RAT.

Figure 1:
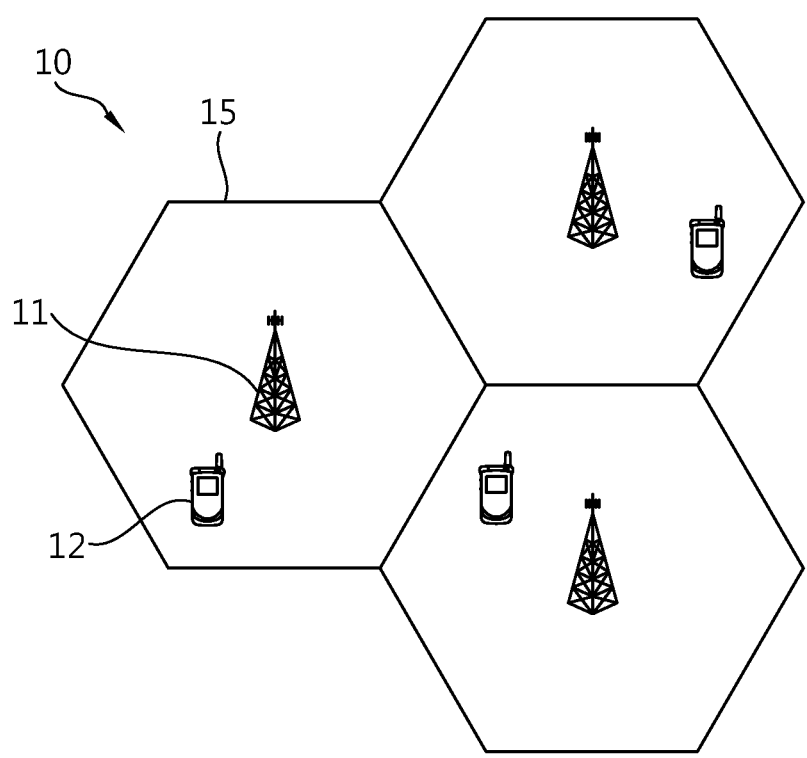
FIG. 1 is a view showing a wireless communication system.

FIG. 1 is a view showing a wireless communication system.

With reference to FIG. 1, a wireless communication system 10 includes at least one base station (BS) 11. Each BS 11 provides a communication service to a particular geographical area 15 generally called a cell. The cell may be divided into a plurality of areas, and each area is called a sector. The BS 11 refers to a fixed station communicating with a UE 13, and may be called by other terminologies such as eNB (evolved NodeB), BTS (Base Transceiver System), AP (Access Point), AN (Access Network), or the like, The BS 11 may perform functions such as connectivity with the UE 12, management, controlling, and resource allocation (or resource assignment).

The UE 12 may be fixed or mobile and may be called by other names such as MS (Mobile Station), UT (User Terminal), SS (Subscriber Station), wireless device, PDA (Personal Digital Assistant), wireless modem, handheld device, AT (Access Terminal), or the like. Hereinafter, downlink (DL) refers to communication from the BS 11 to the UE 12 and uplink (UL) refers to communication from the UE 12 to the BS 11.

Figure 2:
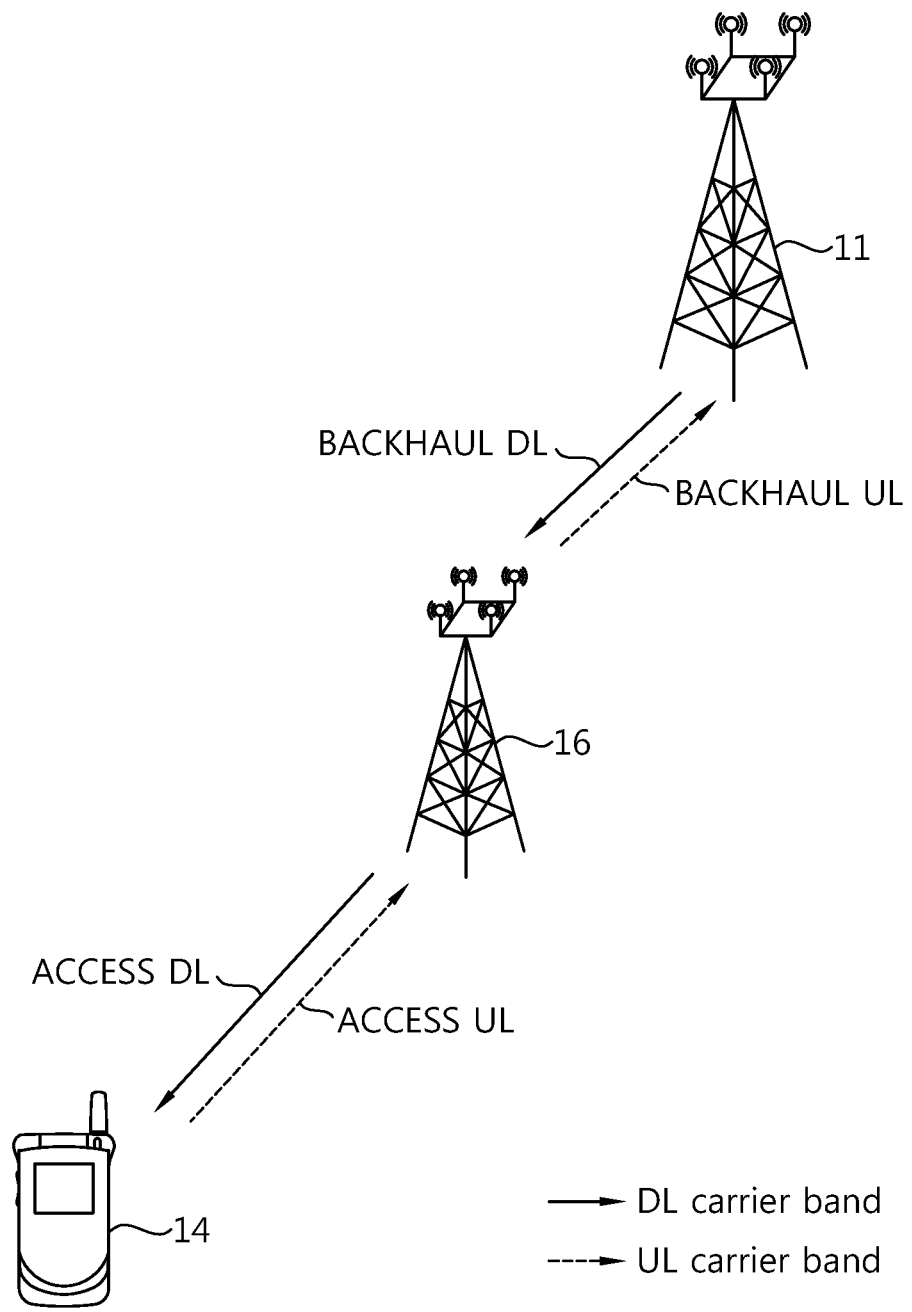
FIG. 2 is a view showing a wireless communication system including a relay station.

FIG. 2 is a view showing a wireless communication system including a relay station. A relay station (RS) 16 refers to a device relaying a signal between the BS 11 and a UE 14, and may be called by other names such as RN (Relay Node), repeater, or the like.

The UE may be divided into a macro UE (Ma UE) and a relay UE (Re UE). Here, the macro UE (Ma UE) 13 is a terminal which directly communicates with the BS 11 and the relay UE (Re UE) 14 refers to a terminal which communicates with the RS 16. Although the macro UE 13 is within the cell of the BS 11, it may communicate with the BS 11 through the RS 16 in order to improve a transfer rate according to a diversity effect. The macro UE 13 and/or the relay UE 14 may include an LTE UE or an LTE-A UE.

Hereinafter, a backhaul link refers to a link between the BS 11 and the RS 16, and backhaul downlink refers to communication from the BS 11 to the RS 16 and backhaul uplink refers to communication from the RS 16 to the BS 11. An access link refers to a link between the RS 16, and the Re UE (relay UE) 14 and access downlink refers to communication from the RS 16 to the Re UE 14 and access uplink refers to communication from the Re UE 14 to the RS 16.

Figure 3:
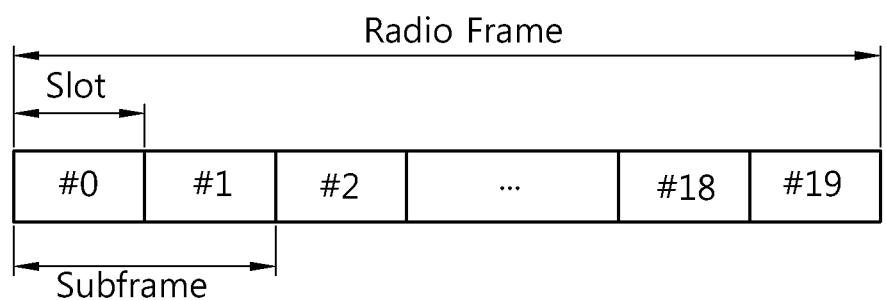
FIG. 3 is a view showing the structure of an FEE (Frequency Division Duplex) radio frame of a 3GPP LTE system.

FIG. 3 is a view showing the structure of an FDD (Frequency Division Duplex) radio frame of the 3GPP LTE system. This may refer to section 4.1 of 3GPP TS 36.211 (V8.4.0) "Technical Specification; Evolved Universal Terrestrial Radio Access (E-UTRA); Physical Channels and Modulation (Release 8)". In an FDD mode, a downlink transmission and an uplink transmission are discriminated in a frequency domain.

With reference to FIG. 3, a radio frame is comprised of ten subframes, and one subframe is comprised of two slots. For example, one subframe may have a length of 1 ms, and one slot may have a length of 0.5 ms. A slot may be comprised of seven OFDM (orthogonal frequency division multiplexing) symbols in a normal CP (Cyclic Prefix) and may be comprised of six OFDM symbols in an extended CP. Thus, a normal subframe having a normal CP may include 14 OFDM symbols, and an extended subframe having an extended CP may include 12 OFDM symbols.

The radio frame structure of FIG. 3 is merely illustrative, and the number of subframes included in the radio frame or the number of slots included in a subframe may be variably changed.

Figure 4:
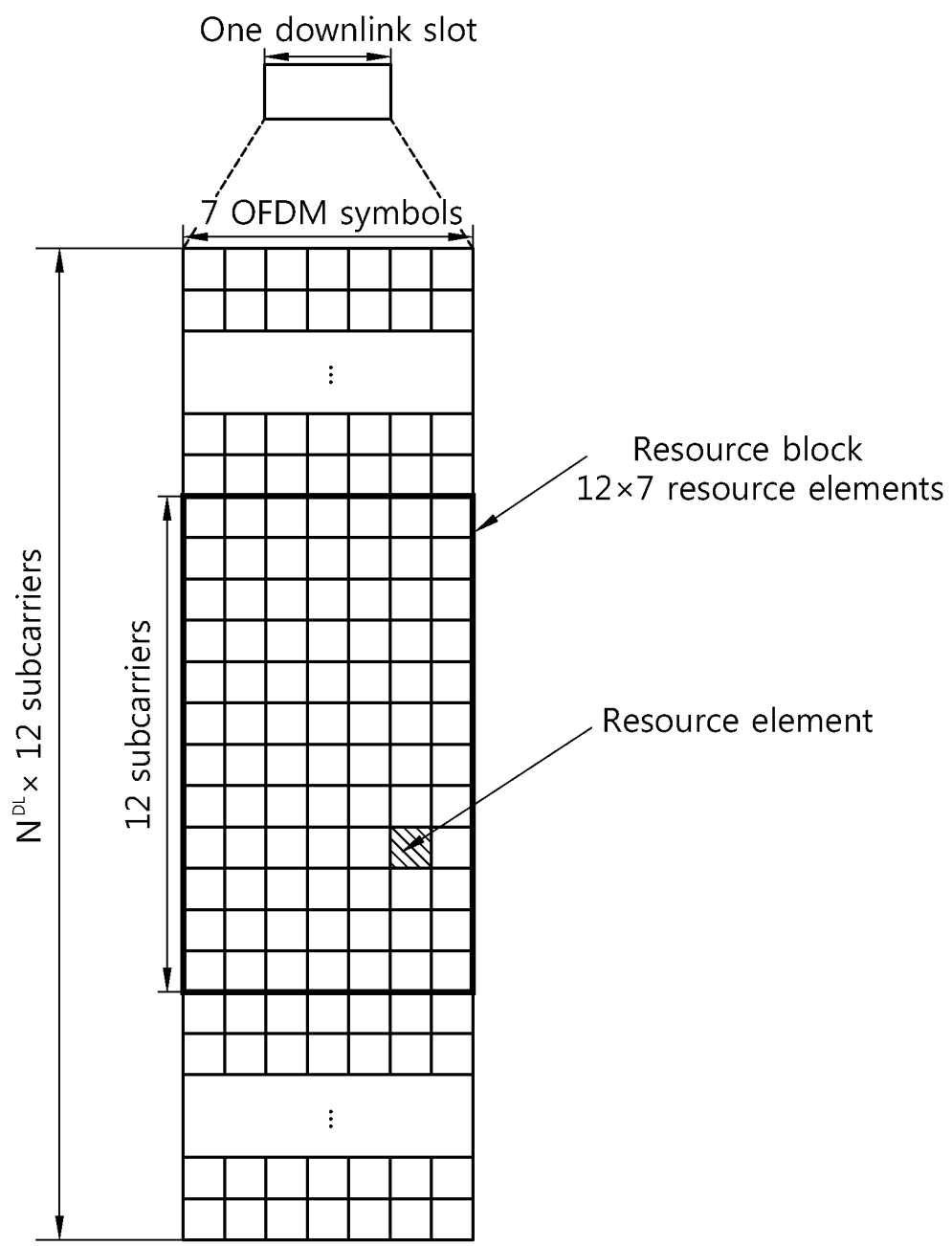
FIG. 4 is a view showing a resource grid of one slot.

FIG. 4 is a view showing a resource grid of one slot.

With reference to FIG. 4, a slot (e.g., a downlink slot included in a downlink subframe) includes a plurality of OFDM symbols in a time domain. Here, it is illustrated that one downlink slot includes seven OFDM symbols and one resource block includes 12 subcarriers in a frequency domain, but the present invention is not limited thereto.

Each element on the resource grid is called a resource element, and one resource block (RB) includes 12×7 number of resource elements. The number $N^{DL}$ of resource blocks included in the downlink slot is dependent upon a downlink transmission bandwidth configuration in a cell.

Figure 5:
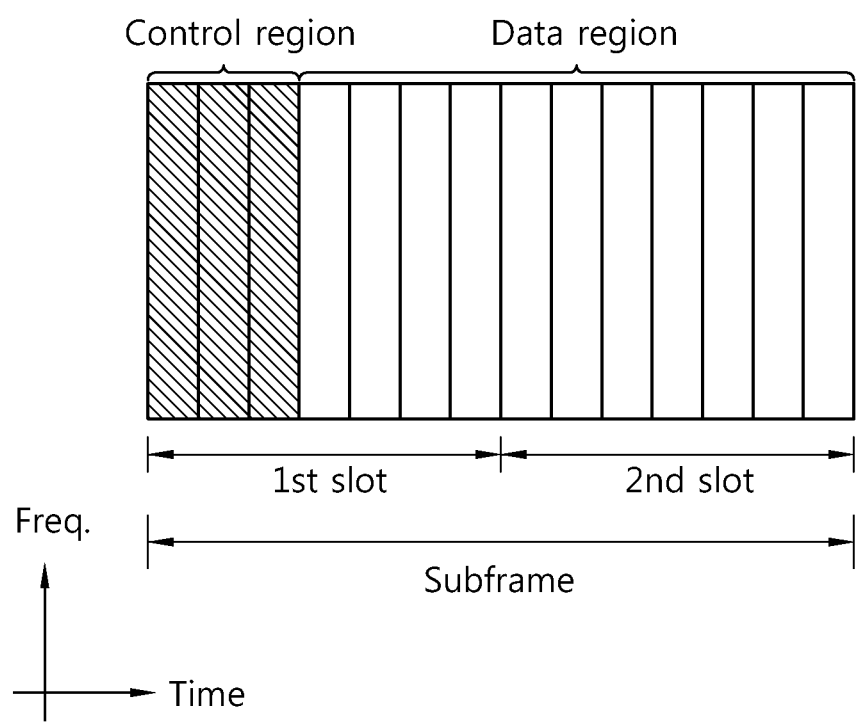
FIG. 5 is a view showing an example of the structure of a downlink subframe used in the 3GPP LTE.

FIG. 5 is a view showing an example of the structure of a downlink subframe used in the 3GPP LTE.

With reference to FIG. 5, a subframe includes two slots. A maximum of front four OFDM symbols in a first slot is a control region to which control channels are allocated, and the other remaining OFDM symbols are a data region to which a PDSCH (Physical Downlink Shared Channel) is allocated.

Downlink control channels used in LTE include a PCFICH (Physical Control Format Indicator Channel), a PHICH (Physical Hybrid-ARQ Indicator Channel), a PDCCH (Physical Downlink Control Channel), and the like.

The PCFICH is transmitted on the first OFDM symbol of the subframe, and carries information regarding the number (i.e., the size of the control region in the time domain) of OFDM symbols used in transmitting control channels within the subframe.

The PHICH carries an ACK (Acknowledgement)/NACK (Not-Acknowledgement) signal with respect to an uplink HARQ (Hybrid Automatic Repeat Request). That is, an ACK/NACK signal with respect to uplink data transmitted by a UE is transmitted on the PHICH. A PHICH duration refers to the number of OFDM symbols which can be used for transmitting the PHICH.

The PDCCH may carry a transmission format and a resource allocation of a DL-SCH (Downlink-Shared Channel), resource allocation information of a UL-SCH (Uplink Shared Channel), paging information on a PCH, system information on a DL-SCH, a resource allocation of a higher layer control message such as a random access response transmitted on a PDSCH, a set of transmission power control commands with respect to individual UEs in a certain UE group, an activation of a VoIP (Voice over Internet Protocol), and the like. A plurality of PDCCHs may be transmitted in the control region, and a UE can monitor the plurality of PDCCHs. The PDCCHs are transmitted on one or an aggregation of some consecutive CCEs (Control Channel Elements). A CCE is a logical allocation unit used to provide a coding rate according to the state of a wireless channel to the PDCCH. CCEs correspond to a plurality of resource element groups. The format of the PDCCH and an available number of bits of the PDCCH are determined according to an associative relation between the number of the CCEs and a coding rate provided by the CCEs. Control information transmitted via the PDCCH is called downlink control information (DCI). The DCI indicates uplink resource allocation information (which is also called an uplink grant), downlink resource allocation information (which is also called a downlink grant), an uplink transmission power control command with respect to certain terminal groups, and the like.

Table below shows DCIs according to DCI formats.

TABLE 1

| DCI Format | Description |
|---|---|
| DCI format 0 | used for the scheduling of PUSCH |
| DCI format 1 | used for the scheduling of one PDSCH codeword |
| DCI format 1A | used for the compact scheduling of one PDSCH codeword and random access procedure initiated by a PDCCH order |
| DCI format 1B | used for the compact scheduling of one PDSCH codeword with precoding information |
| DCI format 1C | used for very compact scheduling of one PDSCH codeword |
| DCI format 1D | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI | used for the transmission of TPC commands for PUCCH and |

TABLE 1-continued

| DCI Format | Description |
|---|---|
| format 3 | PUSCH with 2-bit power adjustments |
| DCI format 3A | used for the transmission of TPC commands for PUCCH and PUSCH with single bit power adjustments |

DCI format 0 indicates uplink resource allocation information, and DCI formats 1 and 2 indicate downlink resource allocation information, and DCI formats 3 and 3A indicate an uplink TPC (Transmit Power Control) command regarding certain UE groups.

A BS determines a PDCCH format according to the DCI desired to be transmitted to the UE, and attaches a CRC (Cyclic Redundancy Check) to the DCI. A unique identifier (which is called an RNTI (Radio Network Temporary Identifier)) is masked on the CRC according to the owner or the purpose of the PDCCH. When the PDCCH is used for a particular UE, a unique identifier of the UE, e.g., a C-RNTI (Cell-RNTI) may be masked on the CRC.

A space for searching for a PDCCH in the control region is called a search space. A set of PDCCH candidates is defined according to a search space. When a set of entire CCEs for the PDCCH in one subframe is a CCE aggregation, a search space is a set of contiguous CCEs starting from a particular starting point within the CCE aggregation according to a CCE group level. The CCE group level is a CCE unit for searching for the PDCCH, and the size of the CCE group level is defined by the number of contiguous CCEs. The CCE group level also refers to the number of CCEs used to transmit a PDCCH. Each search space is defined according to the CCE group level. The positions of PDCCH candidates are generated at every size of CCE group level within a search space.

The search space may be classified into a common search space and a UE-specific search space. The common search space is monitored by every UE within a cell, and the UE-specific search space is monitored by a particular UE. A UE monitors the common search space and/or the UE-specific search space according to control information desired to be received. The number of CCE group levels supported by the common search space is smaller than the number of CCE group levels supported by the UE-specific search space. The common search space and the UE-specific search space may overlap.

In the existing LTE system, when the BS informs a UE about radio resource by which a PDSCH is transmitted through a PDCCH, the BS merely transmits resource block (RB) allocation information of the frequency domain, without transmitting allocation information regarding OFDM symbols in the time domain. This is because, the radio resource of the PDSCH in the time domain within one subframe can be known by the size of the PDCCH transmitted through the PCFICH. Here, the size of the PDCCH is defined in the time domain, which may mean the number of OFDM symbols used in transmitting the PDCCH by the BS to the UE. Hereinafter, the term 'size' will be used to mean the number of OFDM symbols in the time domain.

For example, it is assumed that the size of the PDCCH transmitted through the PCFICH is N (N=1, 2, 3 or 4) and OFDM symbols constituting a single subframe are sequentially indexed by #0 to #13 (in the case of an extended CP, OFDM symbols may be sequentially indexed by #0 to #11). Then, a PDSCH transmission is made through (14-N) number of OFDM symbols, #N to #13 (in the case of the extended CP, (12-N) number of OFDM symbols, #N to #11). Thus, upon receiving the PCFICH, each UE can obtain the information regarding the OFDM symbols on which the PDSCH is transmitted within an allocated resource block.

However, an application of the related art method in the same manner to a backhaul link between a BS and an RS in a wireless communication system including an RS, such as LTE-A, may have a problem with a radio resource allocation. First, in order to clarify the present invention, terms will be defined. Hereinafter, a control channel such as a PDCCH transmitted by a BS to an RS will be referred to as an 'R-PDCCH', and a data channel such as a PDSCH transmitted by the BS to the RS will be referred to as an 'R-PDSCH'. A PDCCH and a PDSCH transmitted by the BS to a macro UE will be referred to as a 'macro PDCCH' and a 'macro PDSCH', respectively. A PDCCH transmitted by the RS to a relay UE (Re UE) will be referred to as a 'relay PDCCH'.

For backward compatibility with the LTE UE, the RS may transmit a control signal to the Re UE (e.g., the LTE UE) during first certain number of OFDM symbols of a subframe and receive a signal from the BS during the remaining OFDM symbols of the subframe. The subframe may be, for example, a MBSFN (MBMS Single Frequency Network) subframe of a 3GPP E-UTRA system. Namely, the RS configures the subframe as an MBSFN subframe in the relationship with the Re UE, and transmits a control signal to the Re UE through a relay PDCCH at a partial time region of the MBSFN subframe and receives a signal from the BS at the other remaining time region.

The size of the R-PDSCH, namely, the number of OFDM symbols for the BS to transmit the R-PDSCH to the RS (or the number of OFDM symbols for the RS to receive the R-PDSCH from the BS) may vary according to the size of a macro PDCCH, the size of the relay PDCCH, a guard time (GT) required according to switching of signal reception/transmission of the RS, or the like.

Figure 6:
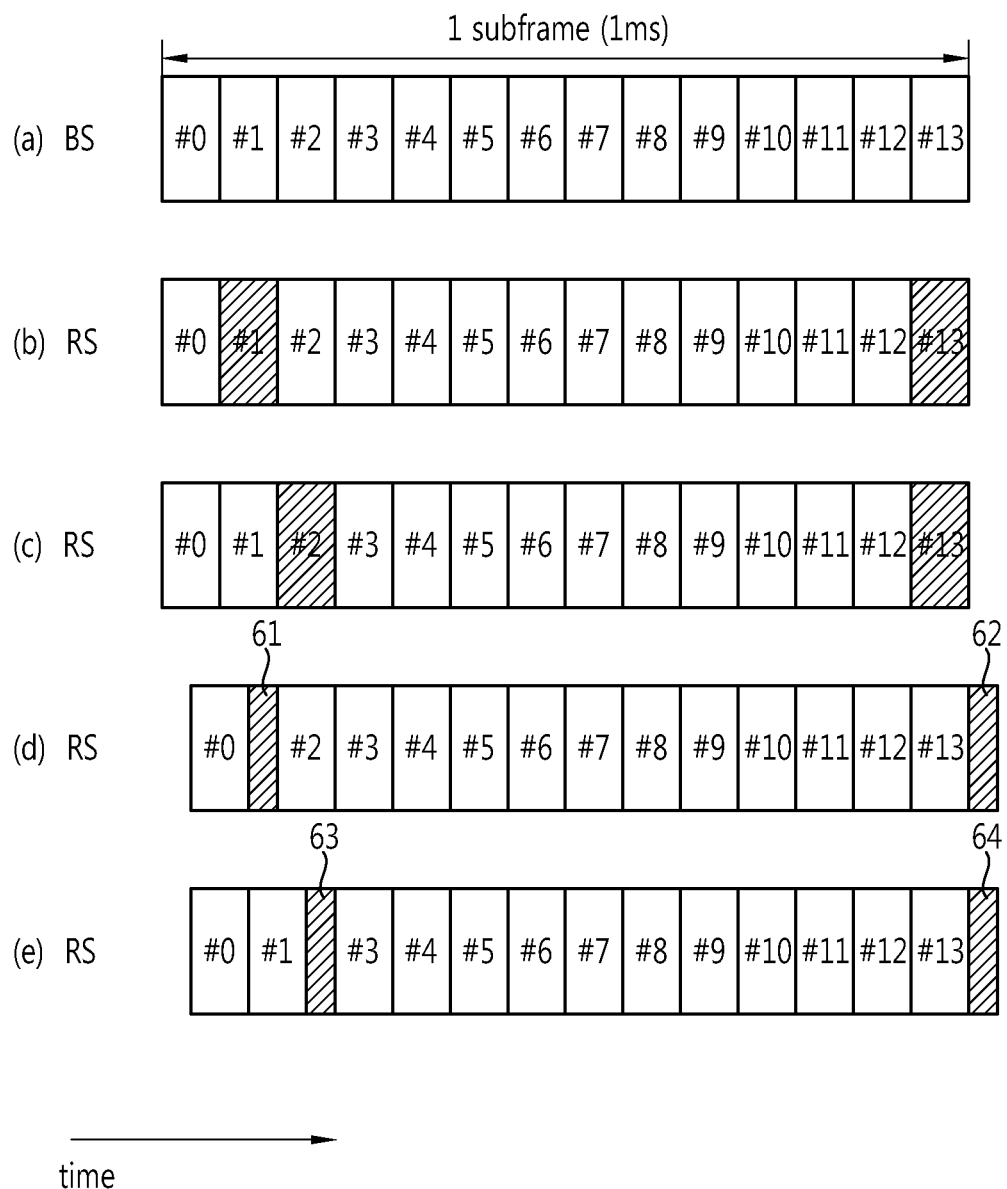
FIG. 6 is a view showing an example of OFDM symbols during which a relay station (RS) can receive data according to the size of the relay PDCCH size in a subframe when a base station (BS) transmits the data to the RS.

FIG. 6 is a view showing an example of OFDM symbols during which the RS can receive data according to the size of the relay PDCCH size in a subframe when the BS transmits the data to the RS.

FIG. 6(a) shows a subframe at the BS' side. FIG. 6(b) shows a case in which the size of the relay PDCCH is 1. In this case, the RS may receive a signal from the BS during OFDM symbol #2 to OFDM symbol #12 of the subframe. After the RS transmits the relay PDCCH at the OFDM symbol #0 to the Re UE, the RS is required to be physically changed from a transmission mode to a reception mode in order to receive a signal from the BS. In order to guarantee a time for such a change, the guard time (GT) is required. Namely, the OFDM symbol #1 serves as the guard time. Also, the OFDM symbol #13 may serve as a guard time when the RS is required to transmit a signal in a next subframe, e.g., when the RS transmits the relay PDCCH to the Re UE.

FIG. 6(c) shows a case in which the size of the relay PDCCH is 2. In such a case, the RS transmits the relay PDCCH to the Re UE during the first two OFDM symbols (i.e., OFDM symbols #0 and #1) of the subframe, uses the OFDM symbol #2 as a guard time, and receives a signal from the BS during the OFDM symbols #3 to #12. OFDM symbol #13 may serve as a guard time.

FIGS. 6(b) and 6(c) show the case in which the BS and the RS accurately synchronize the starting positions of the subframes each other. However, when the starting positions of subframes are not accurately synchronized, delay of a 0.5 OFDM symbol, for example, may occur.

FIG. 6(d) shows a case in which delay of 0.5 OFDM symbol occurs and the size of relay PDCCH of the RS is 1, and FIG. 6(e) shows a case in which delay of 0.5 OFDM symbol occurs and the size of relay PDCCH of the RS is 2. Unlike the cases of FIGS. 6(b) and 6(c), in the case of FIGS. 6(d) and 6(e), the RS can receive a signal transmitted during OFDM symbol #13 corresponding to the last OFDM symbol of the subframe. The guard times 61, 62, 63, and 64 may be an interval, e.g., 0.5 OFDM symbol, smaller than one OFDM symbol.

As mentioned above, radio resources may be variably changed in the time domain in which the RS can receive the R-PDSCH. Thus, it may be difficult for the RS to accurately recognize a radio resource area in which the R-PDSCH is received, only by the allocation information regarding the radio resource, e.g., the resource blocks, in the frequency domain in which the R-PDSCH may be received.

Figure 7:
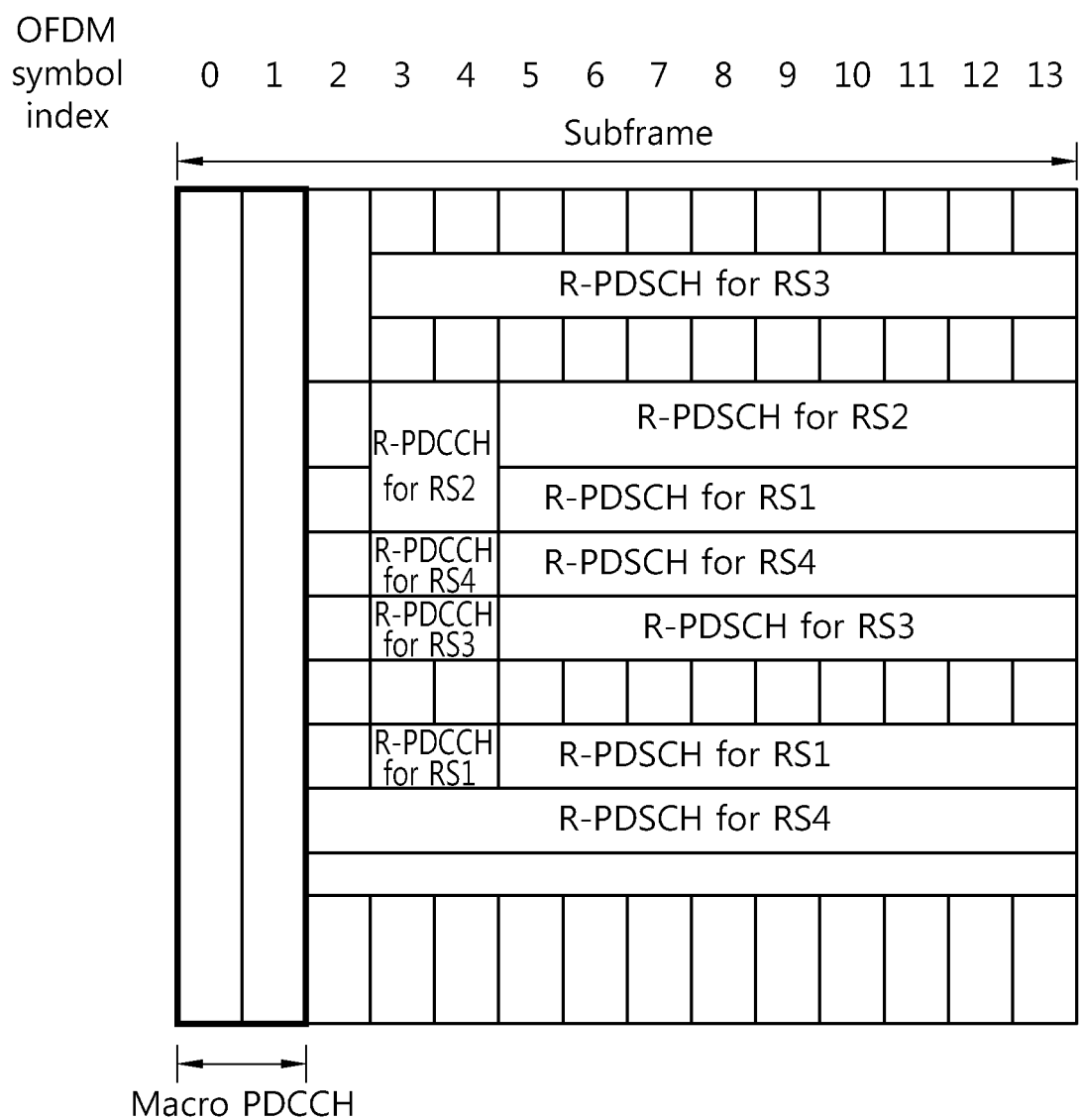
FIG. 7 is a view showing an example of allocating, by the base station, radio resource to transmit an R-PDSCH in a subframe.
Figure 8:
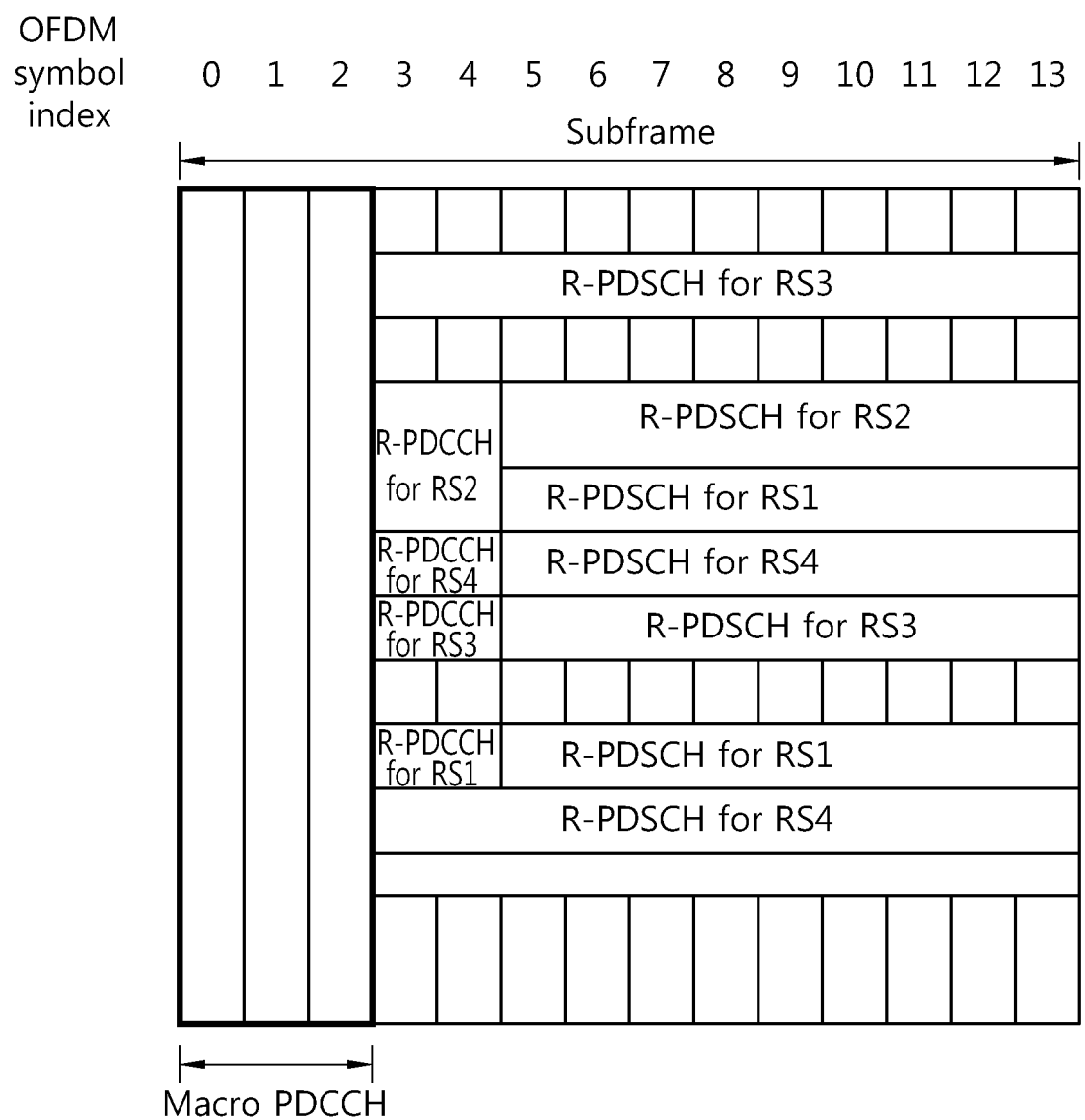
FIG. 8 is a view showing another example of allocating, by the base station, radio resource to transmit an R-PDSCH in a subframe.

FIGS. 7 and 8 show examples of allocating radio resources to transmit the R-PDSCH in a subframe at the BS' side. In FIGS. 7 and 8, the OFDM symbols of the subframe are indexed with #0 to #13.

In FIGS. 7 and 8, it is assumed that a subframe at the RS's side is delayed by 0.5 OFDM symbol over a subframe at the BS's side (Thus, the RS can receive a signal even during the OFDM symbol #13). Also, an RS1 and an RS 4 have a relay PDCCH size of 1, and an RS 2 and an RS 3 have a relay PDCCH size of 2. Here, in FIG. 7, the size of a macro PDCCH is 2, and in FIG. 7, the size of a macro PDCCH is 3.

In FIG. 7, the RS1 and RS 4 can receive an R-PDSCH during OFDM symbol #2, while in FIG. 8, RS1 and RS4 cannot receive an R-PDSCH during OFDM symbol #2. This is because the BS transmits a macro PDCCH during OFDM symbol #2.

In FIG. 8, the case in which the size of the macro PDCCH is 3 is taken as an example, but when the downlink frequency band of the BS is 10 RB or lower, the size of the macro PDCCH may become 4. Then, the OFDM symbol #3 can be used for the macro PDCCH transmission of the BS. In this case, regardless of the size of the relay PDCCH, namely, no matter whether or not the size of the relay PDCCH is 1 or 2, the RS cannot receive an R-PDCCH and an R-PDSCH during the OFDM symbol #3.

As afore-mentioned, the R-PDCCH may be transmitted in various OFDM symbols, and in order to minimize the RS's burden of searching the R-PDCCH, in an embodiment of the present invention, a starting position of OFDM symbols during which the R-PDCCH is transmitted may be limited. That is, irrespective of the size of the relay PDCCH, i) when the size of the frequency band used by the BS for a backhaul downlink transmission is greater than 10 RB, the R-PDCCH is transmitted by using OFDM symbols from and after the OFDM symbol #3. Namely, a starting position of the OFDM symbols during which the R-PDCCH is transmitted is the OFDM symbol #3. ii) When the size of the frequency band used by the BS for a backhaul downlink transmission is 10 RB or smaller than 10 RB, the R-PDCCH is transmitted by using OFDM symbols from and after OFDM symbol #4. Namely, a starting position of the OFDM symbols during which the R-PDCCH is transmitted is the OFDM symbol #4. iii) Or, the BS may transmit the R-PDCCH by using OFDM symbols after the OFDM symbol #4 regardless of the size of the frequency band used in the backhaul downlink transmission. Namely, a starting position of the OFDM symbols during which the R-PDCCH is transmitted is the OFDM symbol #4. Thereafter, the R-PDCCH is demodulated based on cell-specific reference signals transmitted on two antenna ports.

In this manner, when the starting position of the OFDM symbols during which the R-PDCCH is transmitted is limited, the R-PDSCH may be transmitted during an OFDM symbol (e.g., OFDM symbol #2 or OFDM symbol #3) positioned before the OFDM symbol during which the R-PDCCH is transmitted according to the size of the relay PDCCH and the size of the macro PDCCH. For example, in FIG. 7, in the case of RS1 and RS4, the R-PDSCH may be transited during the OFDM symbol #2.

Figure 9:
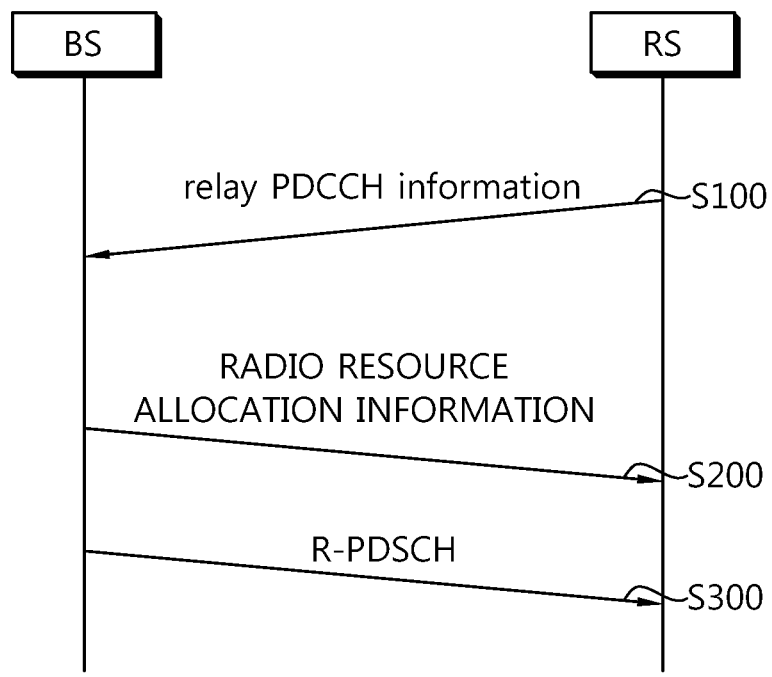
FIG. 9 is a view showing a method for receiving data by a relay station according to an embodiment of the present invention.

FIG. 9 is a view showing a method for receiving data by an RS according to an embodiment of the present invention.

With reference to FIG. 9, the RS transmits relay PDCCH information to the BS (S100). For example, the relay PDCCH information may be the size of a relay PDCCH with respect to a subframe in which the RS will receive a signal from the BS, and may be provided to the BS through higher layer signaling. A subframe in which the RS receives a signal from the BS may be a subframe configured as an MBSFN subframe in an access link between the RS and a Re UE.

Whenever the size of the relay PDCCH of the MBSFN subframe is changed, the RS may inform the BS accordingly. Or, the RS may transmit the size of the relay PDCCH at certain periods through higher layer signaling. In this case, the period at which the relay PDCCH information is transmitted may have a value which is specific to each RS or may have a value common to every RS within a cell. When the period has a value unique to each RS, the BS may transmit information regarding the period to each RS through higher layer signaling. When the period has a value common to every RS within a cell, the BS may transmit the information regarding the period in the form of system information through a broadcast channel or may transmit the information regarding the period through higher layer signaling.

The RS receives radio resource allocation information from the BS (S200). In this case, the radio resource allocation information may include information regarding allocation of OFDM symbols in the time domain as well as information regarding allocation of resource blocks in the frequency domain with respect to the R-PDSCH.

For example, the radio resource allocation information may be transmitted to the RS through an R-PDCCH. As mentioned above, in order to minimize the RS's burden of searching for the R-PDCCH, a start position of OFDM symbols during which the R-PDCCH is transmitted may be limited. In other words, the R-PDCCH may be received during predetermined OFDM symbols in a subframe.

When radio resource allocation information is transmitted via the R-PDCCH, a new DCI format including a value of the size of a macro PDCCH may be newly defined. For example, in FIGS. 7 and 8, in case of the RS1, whether or not the OFDM symbol #2 is used to transmit the R-PDSCH according to the size of the macro PDCCH is determined. Accordingly, whether or not the OFDM symbol #2 can be used to transmit the R-PDSCH is informed by transmitting the value of the size of the macro PDCCH to the RS through the new DCI format. In this case, when the value of the size of the macro PDCCH is 1 or 2, the OFDM symbol #2 is used to transmit the R-PDSCH, and when the value of the size of the macro PDCCH is 3, the OFDM symbol #2 is not used to transmit the R-PDSCH. The foregoing example is the same when the starting position of the R-PDCCH is the OFDM symbol #3 or when the starting position of the R-PDCCH is the OFDM symbol #4.

In other embodiment, when radio resource allocation information is transmitted via an R-PDCCH, information indicating whether or not the R-PDSCH is allocated to particular OFDM symbols may be included in the radio resource allocation information. For example, in FIG. 7, in the case of RS1 and RS4, allocation information regarding OFDM symbols #2 may be added and provided by the size of 1 bit, along with the radio resource allocation information.

In another embodiment, when an R-PCFICH indicating the size of the R-PDCCH exists, the size of a macro PDCCH, as well as the size of the R-PDCCH, may also be informed through the R-PCFICH. Here, the R-PCFICH refers to a PCFICH transmitted to the RS.

Figure 10:
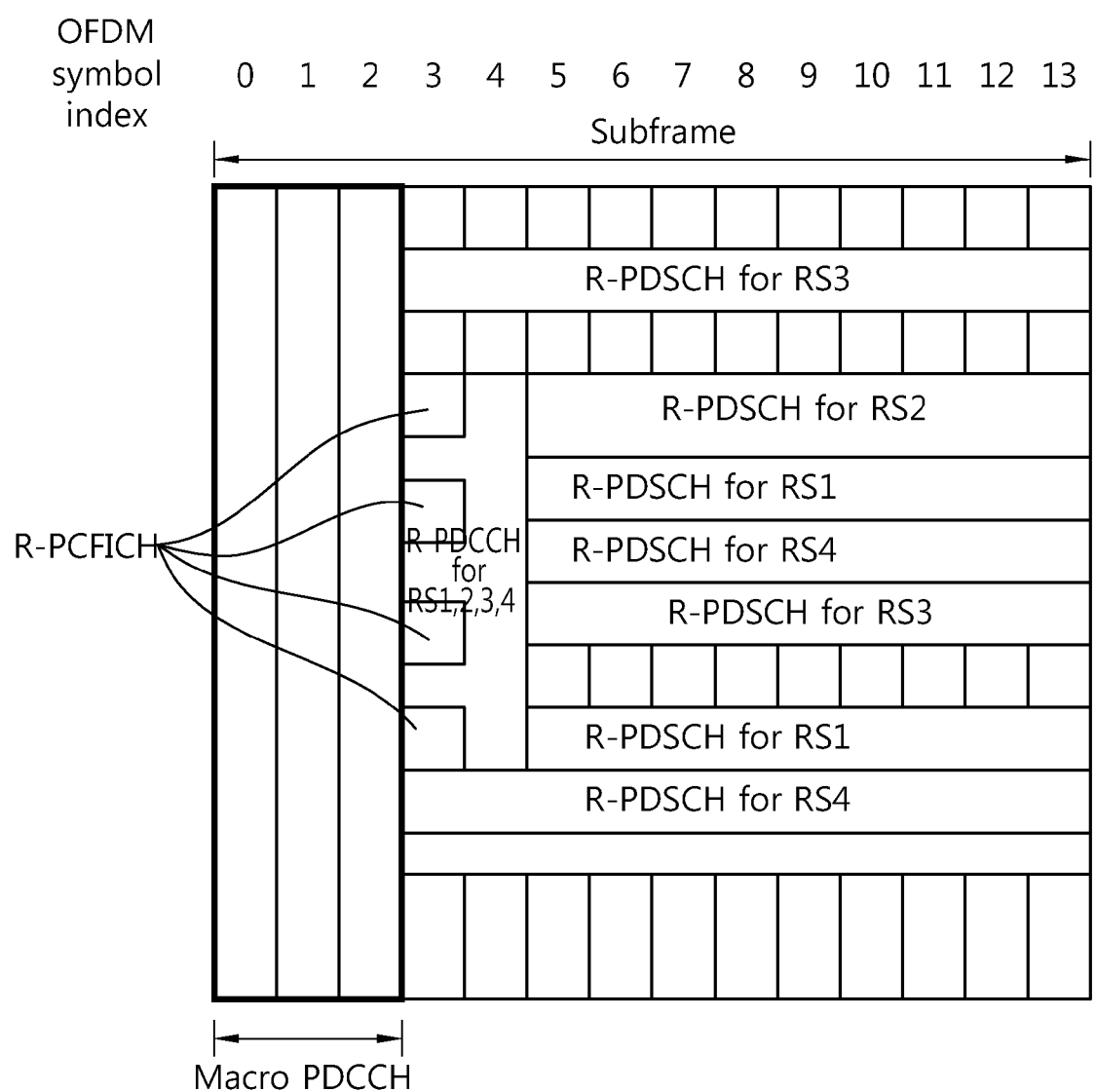
FIG. 10 is a view showing an example of allocating radio resource in a subframe when there is an R-PCFICH indicating the size of an R-PDCCH.

FIG. 10 is a view showing an example of allocating radio resource in a subframe when there is an R-PCFICH indicating the size of the R-PDCCH.

When the size of a macro PDCCH, as well as the size of the R-PDCCH, is informed to the RS through the R-PCFICH, the RS can be aware of, for example, whether or not the R-PDSCH can be transmitted through the OFDM symbol #2 or the OFDM symbol #3 according to the value of the size of the macro PDCCH. Also, since the BS knows about the size of the relay PDCCH upon receiving it from the RS, it can also know about whether or not the R-PDSCH can be transmitted in the OFDM symbol #2 or the OFDM symbol #3.

Or, irrespective of the presence or absence of the R-PCFICH, a PCFICH indicating the size of the macro PDCCH may be allocated in the area in which the R-PDCCH is transmitted, and the size of the macro PDCCH may be informed to the RS through the PCFICH. Namely, the R-PCFICH transmitted to a RS is not additionally defined and the PCFICH transmitted to the macro UE is utilized.

In still another embodiment, the BS may limit the size of the macro PDCCH with respect to a certain period in subframes allocated to the backhaul downlink, and provide corresponding information to each RS through higher layer signaling. The period limiting the size of the macro PDCCH and the size of the macro PDCCH at the period may be transmitted through an RS-specific unicast channel to an RS or may be transmitted to every RS in a cell through a broadcast channel.

The RS receives data from the BS through the R-PDSCH indicated by the received radio resource allocation information (S300).

Figure 11:
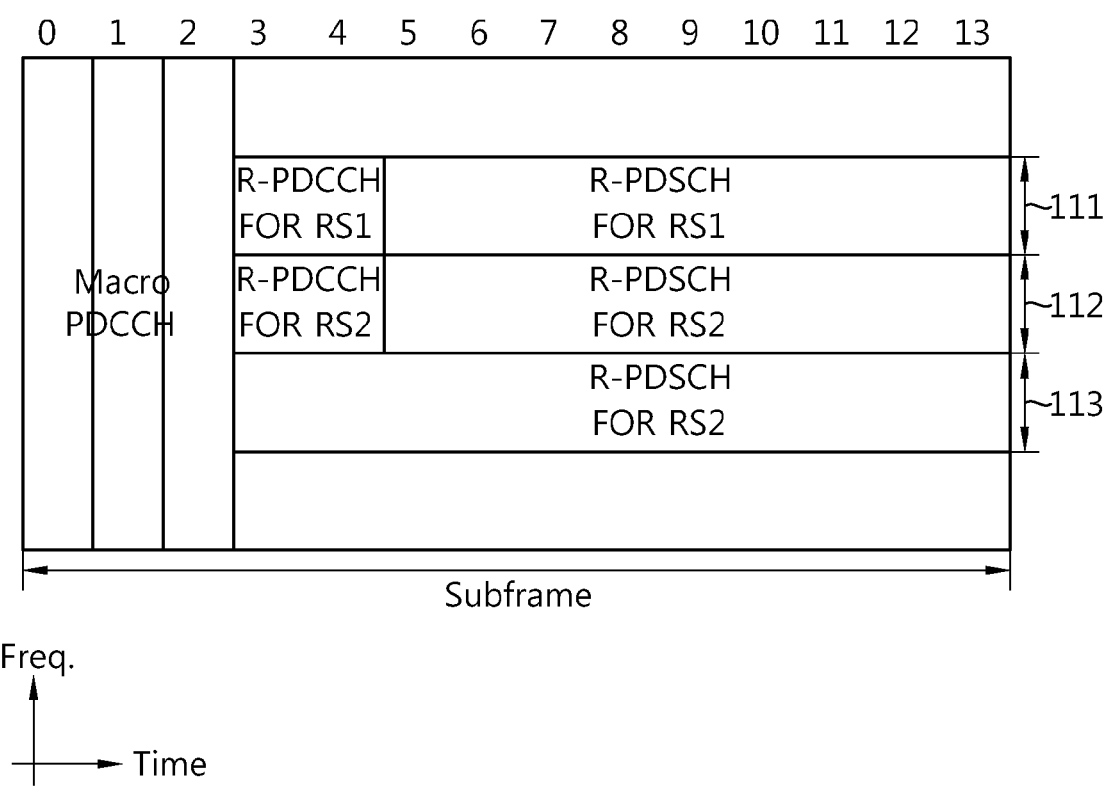
FIG. 11 is a view showing an example of allocating radio resource between a base station and a relay station according to another embodiment of the present invention.

FIG. 11 is a view showing an example of allocating radio resource between a BS and an RS according to another embodiment of the present invention.

With reference to FIG. 11, the R-PDCCH, in addition to the R-PDSCH, is also transmitted in a frequency band 111 allocated to the R-PDSCH transmitted to the RS1. Frequency bands 112 and 113 allocated to the R-PDSCH transmitted to RS2 includes a frequency band in which only an R-PDSCH is transmitted and a frequency band in which an R-PDSCH and an R-PDCCH are transmitted. In terms of resource blocks, resource blocks allocated to a certain RS are divided into resource blocks in which the R-PDCCH transmission is made in particular OFDM symbols and resource blocks in which only the R-PDSCH, without the R-PDCCH, is transmitted.

In this sense, the radio resource allocation information transmitted by the BS to the RS may include information regarding an allocation of resource blocks, information regarding whether or not R-PDCCH transmission is made in the allocated resource blocks, and information regarding OFDM symbols during which the R-PDCCH is transmitted.

For example, when the BS informs the RS about the size of the R-PDCCH through the R-PCFICH or higher layer signaling (which is the same when the RS can implicitly knows about the size of the R-PDCCH or when the size of the R-PDCCH is specified), additional information having the size of 1 bit indicating whether or not R-PDCCH transmission is made in the allocated resource blocks may be transmitted along with the information regarding an allocation of the resource blocks in which the R-PDSCH is transmitted. Then, in FIG. 11, the RS knows about, in advance, that a starting position of R-PDCCH is the OFDM symbol #3, and is able to know that the size of the R-PDCCH is 2 and whether or not the OFDM symbol #3 and the OFDM symbol #4 have been allocated to transmit the R-PDSCH or the R-PDCCH in the allocated resource blocks through the radio resource allocation information.

When the size of the R-PDCCH is dynamically changed by subframe or by RS, the radio resource allocation information may include resource block allocation information, information indicating the size of the R-PDCCH in addition to the 1-bit additional information. The radio resource allocation information may be transmitted through a new DCI format. Here, the new DCI format may include the radio resource allocation information, the 1-bit additional information field indicating whether or not the R-PDCCH transmission is made within the allocated resource blocks, and a field indicating the size of the R-PDCCH. The field indicating the size of the R-PDCCH may be transmitted only when the R-PDCCH exists, or may be transmitted regardless of the presence of the R-PDCCH (In this case, when the R-PDCCH does not exist, the field value indicating the size of the R-PDCCH may be defined to 0). The RS may receive the R-PDSCH through OFDM symbols excluding the OFDM symbols during which the R-PDCCH is transmitted in the resource blocks indicated by the resource block allocation information.

In still another embodiment, the radio resource allocation information regarding the R-PDSCH may be transmitted through a different DCI format including resource block allocation information and a bitmap field with respect to OFDM symbols during which the R-PDSCH transmission is made. For example, in FIG. 11, the RS1 may receive the R-PDSCH during a total of nine OFDM symbols from OFDM symbol #5 to OFDM symbol #13 in an allocated frequency band 111. In this case, the allocated frequency band can be known through the resource block allocation information, and the information regarding the OFDM symbols to be used for receiving the R-PDSCH can be known by the bitmap field value. In this case, the bitmap field may be comprised of nine bits. An OFDM symbol during which the R-PDSCH is transmitted may be given a value 1, and an OFDM symbol during which the R-PDSCH is not transmitted may be given a value '0' (or vice versa). Similarly, in the case of RS2, an allocated frequency band 113 can be known through the resource block allocation information and the OFDM symbols during which the R-PDSCH is transmitted may be known through the bitmap field value. In this case, the bitmap field may be comprised of 11 bits.

In another embodiment, the radio resource allocation information with respect to the R-PDSCH may be transmitted through a DCI format including the resource block allocation information and a field indicating the index of an OFDM symbol from which the R-PDSCH starts to be transmitted. In this case, the RS is able to know about the starting position of the R-PDSCH transmission by using the index field value of the OFDM symbol from which the R-PDSCH starts to be transmitted.

In the foregoing embodiments, the case in which the RS receives the R-PDCCH in the first slot of a subframe is taken as an example. However, the present invention is not limited thereto and can be applicable in the same manner to a case in which the RS receives the R-PDCCH in a second slot of a subframe.

Figure 12:
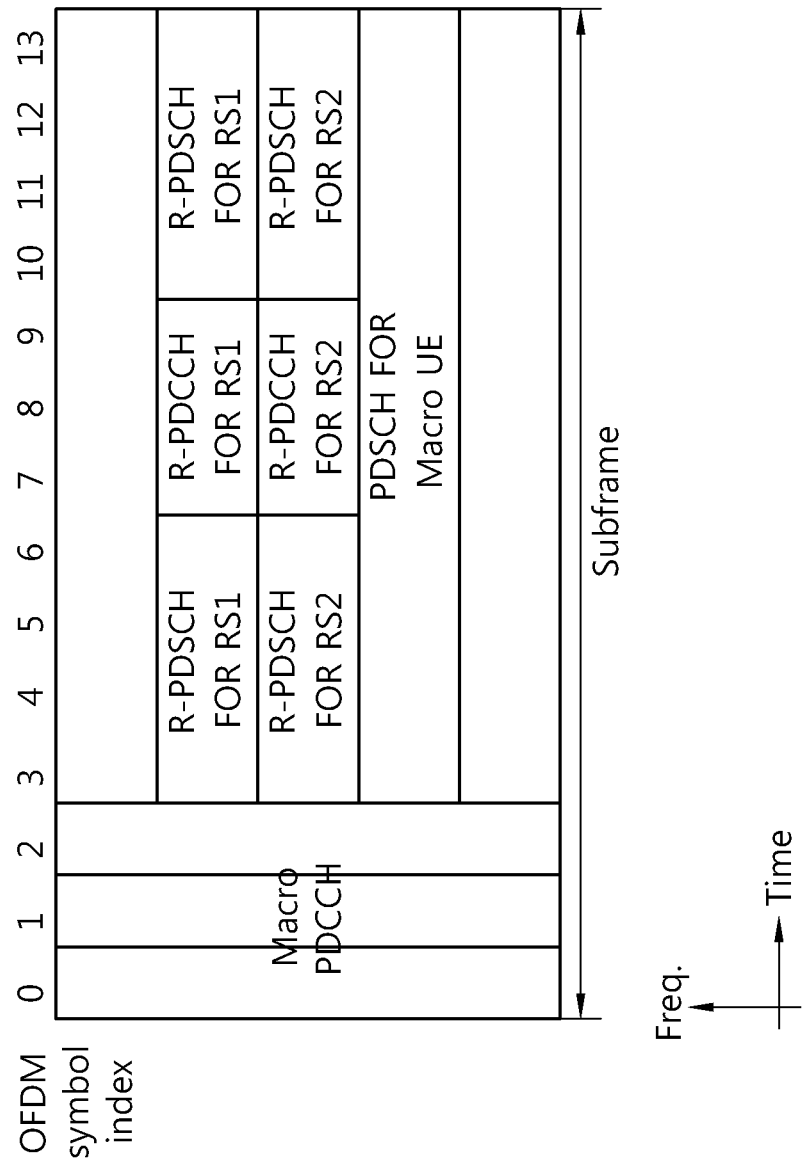
FIG. 12 is a view showing an example of allocating radio resource to transmit an R-PDSCH in a subframe at a base station's side according to an embodiment of the present invention.

FIG. 12 is a view showing an example of allocating radio resource to transmit the R-PDSCH in a subframe at the BS's side according to an embodiment of the present invention. In FIG. 12, it is assumed that a subframe at the RS's side is delayed by 0.5 OFDM symbol over a subframe at the BS's side. Thus, the RS can receive a signal from the BS even at the OFDM symbol #13.

With reference to FIG. 12, the BS can transmit the R-PDCCH in the second slot. For example, the BS can transmit the R-PDCCH to the RS1 or the RS2 through first N number of OFDM symbols, e.g., three OFDM symbols, of the second slot. Here, N may be any one of integers of 1, 2, and 3. Also, the BS may transmit the R-PDSCH during the other remaining OFDM symbols excluding the OFDM symbols during which the R-PDCCH is transmitted and the OFDM symbols during which the macro PDCCH is transmitted.

In such a case, first, the RS transmits relay PDCCH information to the BS. The BS can know about the size of the relay PDCCH through the relay PDCCH information. Thus, the BS can know about the OFDM symbols during which the R-PDSCH can be received by the RS. The BS transmits radio resource allocation information through the R-PDCCH. In the present embodiment, the R-PDCCH is transmitted through predetermined OFDM symbols, namely, first N number of OFDM symbols of the second slot. The radio resource allocation information may include information regarding an allocation of OFDM symbols in the time domain as well as the information regarding an allocation of resource blocks in the frequency domain with respect to the R-PDSCH.

When the R-PDCCH includes the R-PCFICH, the size of the macro PDCCH, as well as the size of the R-PDCCH, may be informed to the RS through the R-PCFICH. The RS receives the R-PDSCH in a radio resource area determined through the radio resource allocation information. It is obvious that the methods described above with reference to FIGS. 10 and 11 can be applicable to the present embodiment in which the RS receives the R-PDCCH in the second slot of the subframe.

Figure 13:
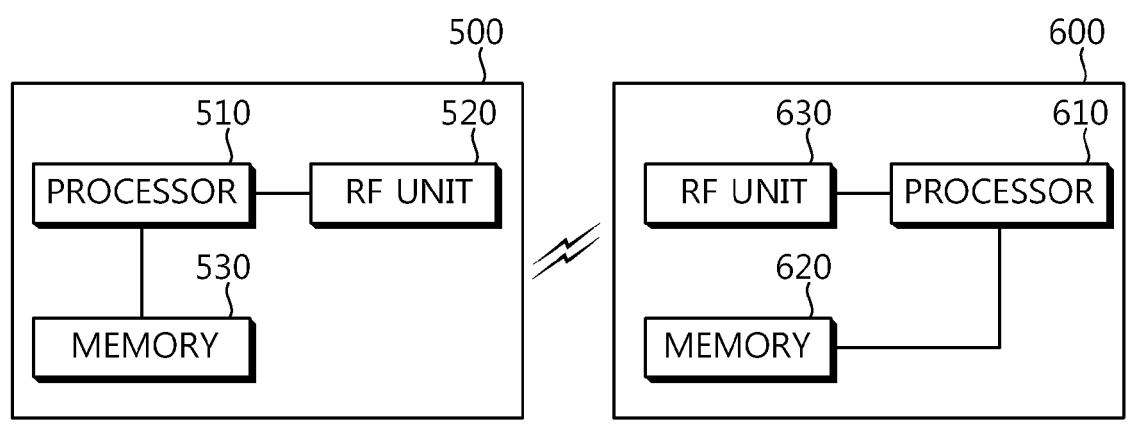
FIG. 13 is a schematic block diagram of a wireless communication system implementing an embodiment of the present invention.

FIG. 13 is a schematic block diagram of a wireless communication system implementing an embodiment of the present invention. A BS 500 includes a processor 510, a memory 530, and an RF unit 520. The processor 510 generates information regarding an allocation of radio resource with respect to a subframe in which a signal is to be transmitted to an RS. The radio resource allocation information may include information regarding an allocation of resource blocks in the frequency domain to which an R-PDSCH for transmitting data to the RS is allocated and information regarding an allocation of OFDM symbols in the time domain. The memory 530, connected to the processor 510, stores various types of information for driving the processor 510. The RF unit 520, connected to the processor 510, transmits and/or receives a radio signal.

An RS 600 includes a processor 610, a memory 620, and an RF unit 630. The processor 610 obtains radio resource allocation information from a BS, and receives data through an R-PDSCH transmitted in a radio resource area indicated by the radio resource allocation information. The processor 610 transmits relay PDCCH information to the BS. The memory 620, connected to the processor 610, stores various types of information for driving the processor 610. The RF unit 630, connected to the processor 610, transmits and/or receives a radio signal.

The processors 510 and 610 may include an ASIC (application-specific integrated circuit), a different chip-set, a logical circuit and/or a data processing device. The memories 530 and 620 may include ROM (read-only memory), RAM (random access memory), a flash memory, a memory card, a storage medium and/or any other storage devices. The RF units 520 and 630 may include a baseband circuit for processing a radio signal. When an embodiment is implemented by software, the foregoing schemes may be implemented by modules (processes, functions, etc.) for performing the foregoing functions. The modules may be stored in the memories 530 and 620, and executed by the processors 510 and 610. The memories 530 and 620 may exist within or outside of the processors 510 and 610 and may be connected to the processors 510 and 610 through various well-known units.

In the exemplary system as described above, the methods are described based on the flow chart by sequential steps or blocks, but the present invention is not limited to the order of the steps, and a step may be performed in different order from another step as described above or simultaneously performed. It would be understood by a skilled person in the art that the steps are not exclusive, a different step may be included, or one or more of the steps of the flow chart may be deleted without affecting the scope of the present invention.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A method of transmitting and receiving a signal for a relay station in a wireless communication system, the method comprising:
    configuring a subframe, including a plurality of OFDM (orthogonal frequency division multiplexing) symbols in a time domain, as an MBSFN (Multimedia Broadcast multicast service Single Frequency Network) subframe; and
    receiving a backhaul signal from a base station in the subframe,
    wherein OFDM symbols used for the reception of the backhaul signal start from a second OFDM symbol, a third OFDM symbol, or a fourth OFDM symbol of the subframe,
    wherein the subframe comprises a first slot and a second slot in the time domain,
    wherein both the first slot and the second slot comprise 7 OFDM symbols in a normal cyclic prefix (CP),
    wherein the backhaul signal comprises an R-PDCCH (relay-physical downlink control channel) which is a control channel to the relay station from the base station,
    wherein the R-PDCCH is received through the first slot or the second slot from the base station,
    wherein the R-PDCCH is demodulated based on one or more demodulation reference signals transmitted on antenna port 7,
    wherein, when the R-PDCCH is received through the first slot, the R-PDCCH is received from the base station starting with a fourth OFDM symbol of the first slot,
    wherein the backhaul signal further comprises an R-PDSCH, and the R-PDSCH is transmitted only in the second slot, and
    wherein, when a last symbol of the transmitted R-PDSCH is a sixth OFDM symbol of the second slot, the one or more demodulation reference signals transmitted on the antenna port 7 are only mapped to resource elements in the first slot.

2. The method of claim 1, further comprising:
    transmitting an access signal to a relay user equipment in the subframe,
    wherein OFDM symbols used for transmission of the access signal and OFDM symbols used for the reception of the backhaul signal are time multiplexed.

3. A relay station for transmitting and receiving a signal in a wireless communication system, the relay station comprising:
    a radio frequency unit configured to transmit and receive a radio signal; and
    a processor coupled to the radio frequency unit, wherein the processor is configured to:
        configure a subframe, including a plurality of OFDM (orthogonal frequency division multiplexing) symbols in a time domain, as an MBSFN (Multimedia Broadcast multicast service Single Frequency Network) subframe, and
        receive a backhaul signal from a base station in the subframe,
        wherein OFDM symbols used for the reception of the backhaul signal start from a second OFDM symbol, a third OFDM symbol, or a fourth OFDM symbol of the subframe,
        wherein the subframe comprises a first slot and a second slot in the time domain,
        wherein both the first slot and the second slot comprise 7 OFDM symbols in a normal cyclic prefix (CP),
        wherein the backhaul signal comprises an R-PDCCH (relay-physical downlink control channel) which is a control channel to the relay station from the base station,
        wherein the R-PDCCH is received through the first slot or the second slot from the base station,
        wherein the R-PDCCH is demodulated based on one or more demodulation reference signals transmitted on antenna port 7,
        wherein, when the R-PDCCH is received through the first slot, the R-PDCCH is received from the base station starting with a fourth OFDM symbol of the first slot and ending with a seventh OFDM symbol of the first slot,
        wherein the backhaul signal further comprises an R-PDSCH, and the R-PDSCH is transmitted only in the second slot, and
        wherein, when a last symbol of the transmitted R-PDSCH is a sixth OFDM symbol of the second slot, the one or more demodulation reference signals transmitted on the antenna port 7 are only mapped to resource elements in the first slot.

* * * * *